United States Patent

Schlueter, Jr. et al.

[11] Patent Number: 6,063,463
[45] Date of Patent: May 16, 2000

[54] MIXED CARBON BLACK FUSER MEMBER COATINGS

[75] Inventors: Edward L. Schlueter, Jr.; Richard L. Carlston, both of Rochester; James F. Smith, Ontario; Kock-Yee Law, Penfield; Xiaoying Yuan, Fairport, all of N.Y.

[73] Assignee: Xerox Corporation, Stamford, Conn.

[21] Appl. No.: 09/005,175

[22] Filed: Jan. 8, 1998

[51] Int. Cl.[7] .......................... B32B 27/08; B32B 27/18; B32B 27/20; B32B 27/28

[52] U.S. Cl. ..................... 428/36.91; 428/36.9; 428/323; 428/338; 428/339; 428/421; 428/422; 428/447; 428/451; 428/473.5; 399/320; 399/338

[58] Field of Search ..................................... 428/323, 324, 428/328, 329, 330, 331, 421, 422, 473.5, 447, 36.91, 36.9, 339, 338; 399/320, 338

[56] References Cited

U.S. PATENT DOCUMENTS

| | | | |
|---|---|---|---|
| 3,959,574 | 5/1976 | Seanor et al. | 428/425 |
| 5,064,509 | 11/1991 | Melnyk et al. | 204/9 |
| 5,454,980 | 10/1995 | Schlueter, Jr. et al. | 252/500 |
| 5,547,759 | 8/1996 | Chen et al. | 428/421 |
| 5,709,949 | 1/1998 | Chen et al. | 428/421 |
| 5,765,085 | 6/1998 | Law et al. | 399/329 |
| 5,837,340 | 11/1998 | Law et al. | 428/36.8 |

FOREIGN PATENT DOCUMENTS

| | | |
|---|---|---|
| 8-234544 | 9/1996 | Japan . |
| 9-179420 | 7/1997 | Japan . |
| 9-258577 | 10/1997 | Japan . |

*Primary Examiner*—Vivian Chen

[57] ABSTRACT

A fuser member having a resistive heating layer including a polymer and a mixture of more than one variety of carbon black, the mixture including a first carbon black and a second carbon black of a different variety than the first carbon black.

23 Claims, 6 Drawing Sheets

MIXED CARBON BLACK FUSER MEMBER COATINGS

CROSS REFERENCE TO RELATED APPLICATIONS

Attention is directed to U.S. patent application Ser. No. WO9/004,185, filed Jan. 8, 1998, now U.S. Pat. No. 5,998,010, entitled, "Mixed Carbon Black Transfer Member Coatings." The disclosure of this application is hereby incorporated by reference in its entirety.

BACKGROUND OF THE INVENTION

The present invention relates to coatings comprising a polymer and a mixture of carbon blacks as conductive fillers. The mixture of carbon blacks comprises more than one or at least two different varieties or types of carbon black, and preferably a graphite carbon black and a conductive carbon black other than graphite. Additional fillers can be used in addition to the mixture of carbon blacks. The coatings allow for tailoring of conductivity for use of the coatings in components useful in xerographic, including digital, processes. In preferred embodiments, the coatings are useful as coatings for fuser components such as, for example, fuser members including instant-on fuser members, pressure members, donor members, transfuse members and the like. In embodiments, the present coatings allow for the preparation and manufacture of coated components having excellent electrical, chemical and mechanical properties, including conductivity tailored to a desired conductivity range and controlled conductivity, wherein the conductivity of the fuser member is virtually unaffected by changes in temperature, relative humidity, and small changes in filler loadings. In addition, in embodiments, the present coatings are superior in coating reproducability and thickness control. Moreover, in embodiments, the warming-up period for the fuser member is decreased, and the power consumption of the fuser member is decreased, while allowing for high operating temperature and mechanical strength.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

Typically, the thermoplastic resin particles are fused to the substrate by heating to a temperature of between about 90° C. to about 200° C. or higher. It is important in the fusing process that no offset of the toner particles from the support to the fuser member take place during normal operations, because such toner particles offset onto the fuser member may subsequently transfer to other parts of the machine or onto the support in subsequent copying cycles, thus increasing the background or interfering with the material being copied there.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members.

Such heat fixing apparatii demonstrate problems due to the lengthy warm-up time required before the heating body is raised to a specified temperature. In some machines, the fuser member is in heated mode 90 to 100 percent of the time the machine is turned on. Because the fuser is heated at all times, there is an increased chance of overheating, and mechanical problems may result from the fuser member overheating or breaking down from overuse.

Moreover, with the fuser member continuously being heated, much energy is wasted. The Environmental Protection Agency has proposed new "energy star" guidelines for printers and copiers. Current fusers that operate in a continuous heat mode may not meet the expectations of a "green machine."

A preferred fusing system for copying and printing is the use of an "instant-on" fuser system, wherein the image on a copy substrate is fused by positioning the paper through a nip between a fuser roll and a pressure roll, the fuser roll and/or pressure roll comprising a high temperature plastic core substrate, a heat generating layer and a toner releasing layer (or heat transporting layer). The fuser converts electric energy directly to thermal energy, and is therefore more energy efficient. The instant-on fuser member is advantageous in that the warming-up period is reduced as the heater is quick to respond. In addition, the instant-on fuser member allows for a reduction in energy consumption because the heater is off when the machine is not copying.

Instant-on fusing systems as set forth above are well known and disclosed in, for example, U.S. Pat. No. 5,087,946 to Dalal et al., the disclosure of which is hereby incorporated by reference in its entirety. This reference discloses an instant-on fusing system including a fuser roll having a hollow plastic cylinder having a conductive fiber filler and having a relatively thin wall, a back up roll disposed in an engaging relationship, and a heating element disposed within the fuser roll.

Further preferred methods of fusing include transfuse methods, wherein the developed image is simultaneously transferred and fused to a copy substrate.

In order to increase thermal conductivity in fuser members, conductive fillers such as carbon have been added to fusing layers. For example, U.S. Pat. No. 5,084,738 discloses use of a resistive heating layer with resistivity ranging from 20 to 2000 ohm-cm in a fusing apparatus. The resistivity of the layer is achieved by adding conductive carbon fillers into a polymer layer. Also, U.S. Pat. No. 5,064,509 discloses a process for preparing a multi-layered belt which includes a thermoplastic film forming polymer which may be comprised of polyurethane or prepolymers of polyimide, and which may include conductive particles such as carbon black, graphite or titanium dispersed therein.

There exists a need for a fuser member surface which has a stable conductivity in the desired conductivity range which is virtually unaffected by changes in temperature, relative humidity, other environmental changes, and is virtually unaffected by small changes in filler loadings. There further exists a specific need for a fusing system member which is quick to heat up, which allows for decreased use of energy, and in which the conformability and low surface energy properties of the release layer are not affected. There further exists a need for a fusing system which provides for good release properties and a decrease in the occurrence of hot offset. Moreover, there exists a need for improved coating reproducability and thickness control for carbon filled polymer coatings.

SUMMARY OF THE INVENTION

In accordance with the invention, there is provided: a fuser member having a resistive heating layer comprising polymer and a mixture of more than one variety of carbon black, the mixture comprising a first carbon black and a second carbon black of a different variety than the first carbon black.

There is further provided: an apparatus for forming images on a recording medium comprising: a charge-retentive surface to receive an electrostatic latent image thereon; a development component to apply toner to the charge-retentive surface to develop the electrostatic latent image and to form a developed image on the charge retentive surface; a transfer component to transfer the developed image from the charge retentive surface to a substrate; and a fixing component having a resistive heating layer comprising polymer and a mixture of more than one variety of carbon black, the mixture comprising a first carbon black and a second carbon black of a different variety than the first carbon black.

BRIEF DESCRIPTION OF THE DRAWINGS

For a better understanding of the present invention, reference may be had to the accompanying figures.

DETAILED DESCRIPTION OF THE PRESENT INVENTION

Figure 1:
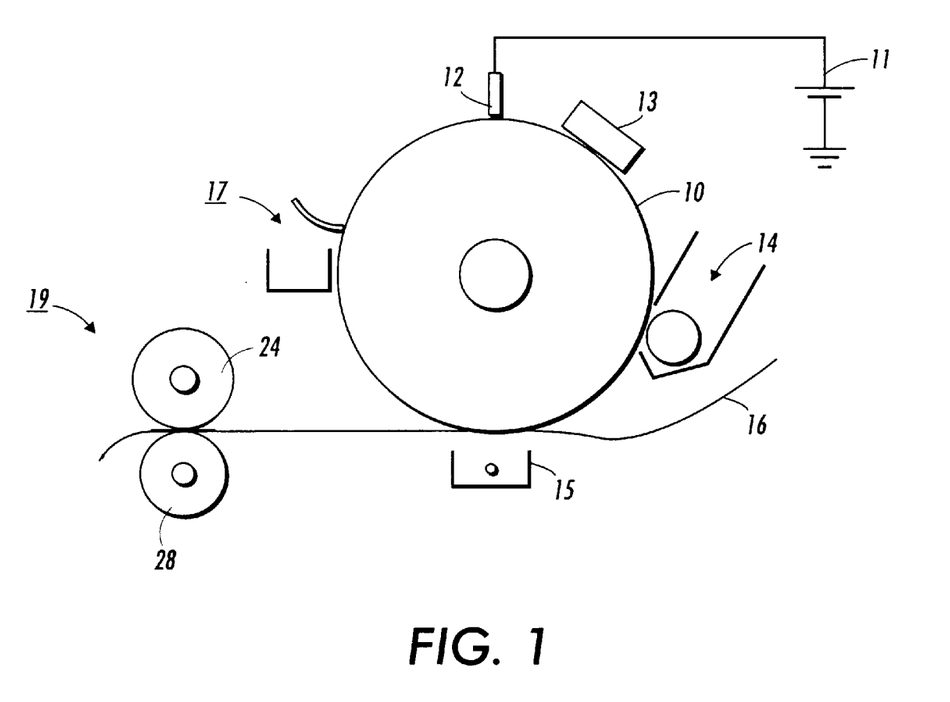
FIG. 1 is a schematic view of an electrostatographic reproducing apparatus including a fusing station.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fuser roll 24 and pressure roll 28, wherein the developed image is fused to copy sheet 16 by passing copy sheet 16 between the fusing and pressure members, thereby forming a permanent image. Photoreceptor 10, subsequent to transfer, advances to cleaning station 17, wherein any toner left on photoreceptor 10 is cleaned therefrom.

Figure 2:
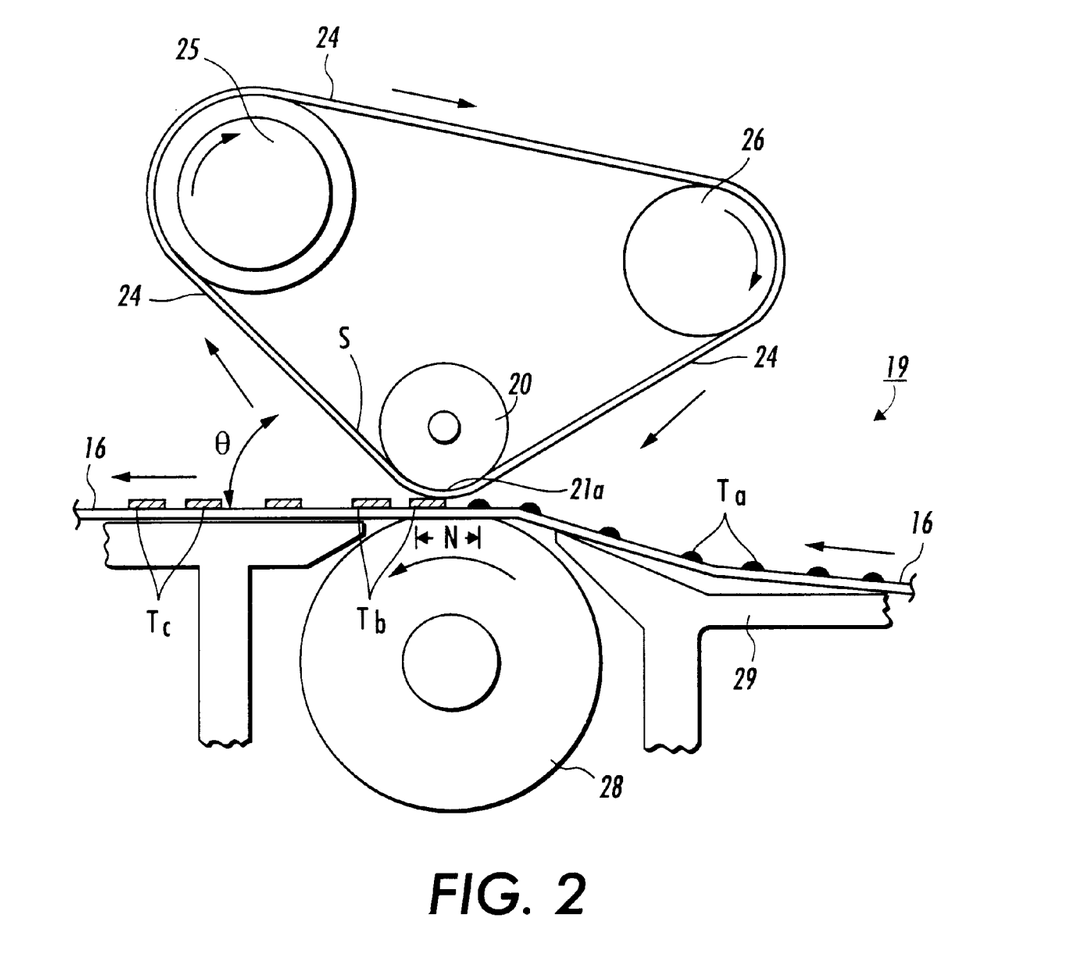
FIG. 2 is a schematic view of a fusing apparatus including a fuser belt and pressure roll configuration.

FIG. 2 depicts an embodiment of the invention, wherein the fusing apparatus 19 is in the form of a fuser belt 24 and pressure roller 28. In FIG. 2, a heat resistive film or an image fixing film 24 comprising the resistive heating layer of the present invention, in the form of an endless belt is trained or contained around three parallel members, that is, a driving roller 25, a follower roller 26 and a contact roller 20 disposed between the driving roller 25 and the follower roller 26. The follower roller 26 also functions as a tension roller for the fixing film 24. In a preferred embodiment of the invention, a current may be passed between contact roller 20 and follower roller 26, both rollers containing electrodes, causing the resistive heating film 24 to heat for effective fusing. The fixing film rotates at a predetermined peripheral speed in the clockwise direction by the clockwise rotation of the driving roller 25. A pressing roller 28 is press-contacted to the contact roller 20 with the bottom travel of the fixing film 24 therebetween. The pressure roller rotates co-directionally, that is, in the counterclockwise direction, with the fixing film 24. The contact roller 20 extends in a direction crossing with the film 24 surface movement direction (film width direction).

Upon an image formation start signal, an unfixed toner image is formed on a recording material at the image forming station. The copy sheet 16 having an unfixed toner image Ta thereon is guided by a guide 29 to enter between the fixing film 24 and the pressing roller 28 at the nip N (fixing nip) provided by the contact roller 20 and the pressing roller 28. Copy sheet 16 passes through the nip between the contact roller 20 and the pressing roller 28 together with the fixing film 24 without surface deviation, crease or lateral shifting while the toner image carrying surface is in contact with the bottom surface with the fixing film 24 moving at the same speed as copy sheet 16. The contact roller 20 is supplied with electric power at a predetermined timing after generation of the image formation start signal so that the toner image is heated at the nip so as to be softened and fused into a softened or fused image Tb.

The fixing film 24 is in contact with the contact roller 20. The distance between the outer layer of the fixing film 24 and the contact roller 20 is preferably from about 0.5 mm to about 5.0 mm. Similarly, the distance between the fixing film 24 and the grounded rollers 25 and 26 is not less than about 5 mm and is, for example, from about 5 to about 25 mm. These distances prevent leakage of the charge applied to the copy sheet 16 by an image (not shown) forming station from leaking to the ground through the copy sheet 16. Therefore, possible deterioration of image quality due to improper image transfer can be avoided, or minimized.

Figure 3:
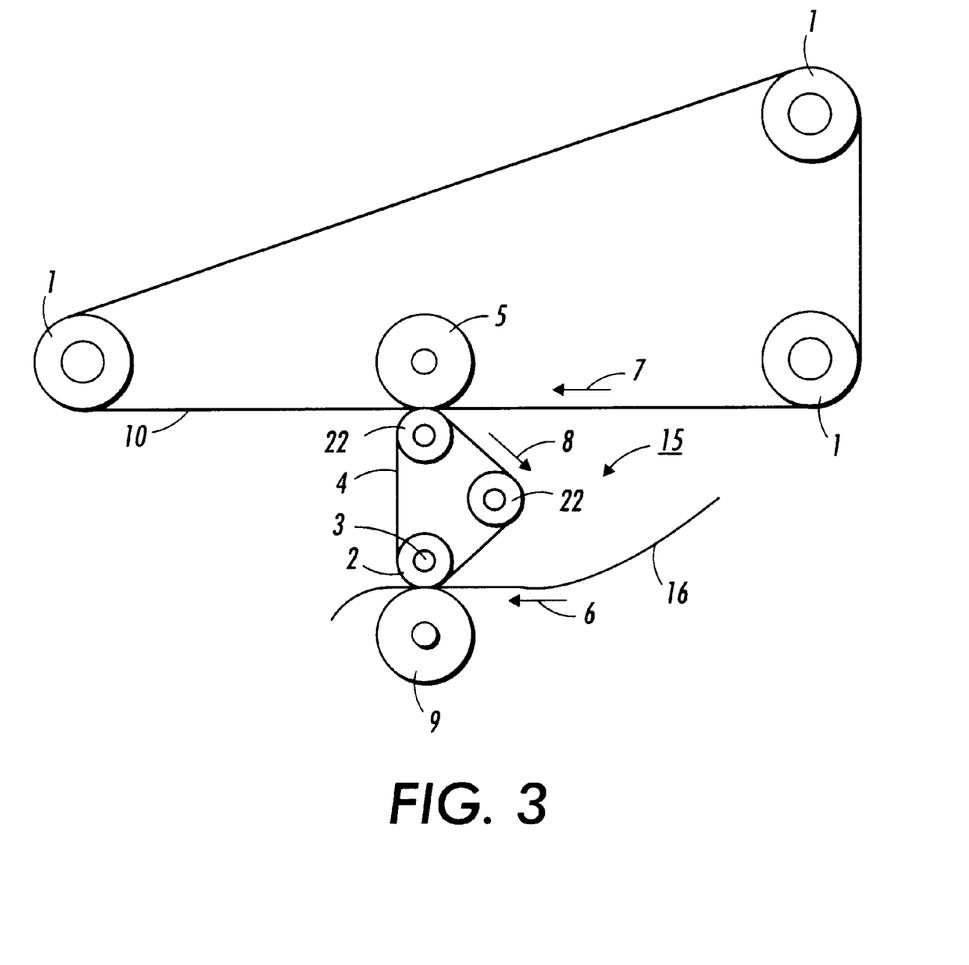
FIG. 3 is a schematic view of a fusing apparatus including a transfuse belt.

Transfer and fusing may occur simultaneously in a transfuse configuration. As shown in FIG. 3, a transfer apparatus 15 is depicted as transfuse belt 4 being held in position by driver rollers 22 and contact roller 2. Contact roller 2 and rollers 22 may comprise an electrode wherein a current can be passed through rollers 22 and roller 2. Transfuse belt 4 is driven by driving rollers 22 in the direction of arrow 8. The developed image from photoreceptor 10 (which is driven in direction 7 by rollers 1) is transferred to transfuse belt 4 when contact with photoreceptor 10 and belt 4 occurs. Pressure roll 5 aids in transfer of the developed image from photoreceptor 10 to transfuse belt 4. The transferred image is subsequently transferred to copy substrate 16 and simultaneously fixed to copy substrate 16 by passing the copy substrate 16 between transfuse belt 4 (containing the developed image) and pressure roll 9. A nip is formed by contact roller 2 and pressure roll 9. Copy substrate 16 passes through the nip formed by contact roller 2 and pressure roll 9, and simultaneous transfer and fusing of the developed image to the copy substrate 16 occurs.

In another embodiment of the invention, not shown in the figures, the fixing film may be in the form of a sheet or film. For example, a non-endless film may be rolled on a supply shaft and taken out to be wrapped on a take-up shaft through the nip between the heater and the pressing roller. Thus, the film may be fed from the supply shaft to the take-up shaft at the speed which is equal to the speed of the transfer material, reference U.S. Pat. No. 5,157,446, the disclosure of which is hereby incorporated by reference in its entirety.

Figure 4:
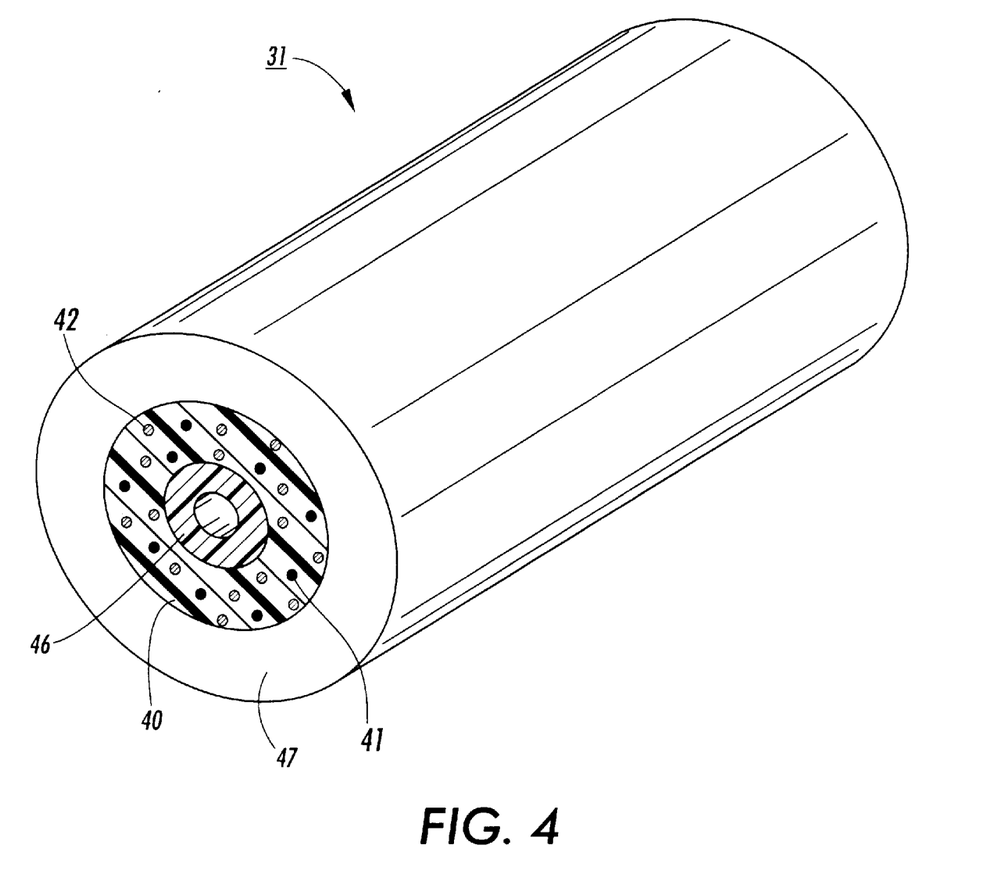
FIG. 4 is a schematic view of an instant-on fuser roll.

In yet another embodiment of the invention, an instant-on fuser member as depicted in FIG. 4 may be used in place of fuser roller 24 of FIG. 1. Instant-on fuser member includes a hollow cylindrical plastic core 46 comprised of a high temperature plastic and thereover a resistive heating layer 40 comprising a polymer and a first graphite carbon black 41 and a second conductive carbon black 42 which is other than graphite, and thereover as the outer layer of the fuser member, a toner releasing layer (or heat transporting layer) 47 which may be comprised of a fluoroelastomer or silicone rubber material or other polymer material and optionally filled with a thermally conductive filler. Optional additional intermediate layers and/or adhesive layers may be present between the inner plastic core 46 and the resistive heating layer 40 and/or between the resistive heating layer 40 and the outer toner releasing layer 47.

Also, the present resistive heating layers are useful for any known fuser member. The term fuser member as used herein refers to fuser rolls, belts, sheets, films and the like; donor rolls, belts, sheets, films and the like; pressure rolls, belts, sheets, films and the like; transfuse rolls, belts, sheets, films and the like; and like fusing members.

The present invention includes, in embodiments, a resistive heating layer for a fuser member including a polymer and conductive fillers including more than one variety or type of carbon black. Preferably the more than one variety of carbon black comprises a graphite carbon black and a conductive carbon black which is not a graphite.

Carbon black systems can be established to make polymers conductive. By use of a combination of carbon blacks as disclosed herein, the conductivity of a polymer can be tailored to a desired conductivity which is unexpectedly higher (resistance unexpectedly lower) than what would be expected. For example, the inventors have demonstrated that by dispersing graphite in a polymer layer (e.g., fluoroelastomer, 4.5 by 9 inches), the resistance of the layer is about 30 ohms. By dispersing a non-graphite carbon black such as BLACK PEARL® 2000 in a polymer (e.g., fluoroelastomer, 4.5 by 9 inches), the resistance of the layer was determined to be 1270 ohms. By combining a mixed carbon black system comprising a graphite carbon black and a non-graphite carbon black, and dispersing the mixed carbon black system into a polymer, the inventors found the resistance of the layer to be 10 ohms, which is unexpectedly lower than both conductivities.

The phrase "more than one variety of carbon black" as used herein, refers to using carbon blacks with different particle geometries, carbon blacks with different resistivities or conductivities, carbon blacks with different chemistries, carbon blacks with different surface areas, and/or carbon blacks with different particle sizes. The use of such carbon systems provides a coating with controlled conductivity within a desired resistivity range that is virtually unaffected by changes in temperature, relative humidity and relatively small changes in filler loadings. Also, resistive heating layers using carbon systems as defined herein provide greater thickness control and coating consistency.

In a preferred embodiment, a graphite carbon black is used in combination with a carbon black that is other than graphite, i.e., a non-graphite carbon black. Graphite carbon black is defined as being of crystalline shape, or the crystalline allotropic form of carbon black, and non-graphite carbon black is a finely divided form of carbon black. In graphite, carbon atoms are located in a plane of symmetrical hexagons and there are layers and layers of these planes in graphite. Non-graphite carbon black, as used herein, refers to any carbon black which is not of crystalline allotropic form. Non-graphite carbon black is formed by incomplete combustion of organic substances, such as hydrocarbons. Examples of non-graphite carbon blacks include furnace blacks, channel blacks, thermal blacks, lamp blacks, acetylene blacks, and the like. Structurally, non-graphite carbon blacks consist of bundles of parallel orientated graphite planes at a distance of between 3.5 to 3.8 angstroms.

Another preferred mixture of carbon black comprises a carbon black or graphite having a particle shape of a sphere, flake, platelet, fiber, whisker, or rectangular used in combination with a carbon black or graphite with a different particle shape, to obtain optimum filler packing and thus optimum conductivities. For example, a graphite having a crystalline shape can be used with a non-graphite carbon black having a shape other than a crystalline shape.

Similarly, by use of relatively small particle size non-graphite carbon blacks with relatively large particle size graphite, the smaller particles "fit" into the packing void areas of the resistive heating layer to improve particle touching. As an example, a graphite carbon black having a relatively large particle size of from about 1 micron to about 100 microns, preferably from about 2 to about 10 microns, and particularly preferred of from about 5 to about 10 microns, can be used in combination with a non-graphite carbon black having a relatively small particle size of from about 10 nanometers to about 1 micron, preferably from about 10 nanometers to about 100 nanometers, and particularly preferred from about 10 nanometers to about 80 nanometers.

In another preferred embodiment, it is preferred to mix a first graphite carbon black having a bulk resistivity of from about 10° to about $10^{-5}$ ohms-cm, and preferably from about $10^{-1}$ to about $10^{-4}$ ohms-cm, with a second non-graphite conductive carbon black having a bulk resistivity of from about $10^4$ to about $10^{-2}$ ohms-cm, and preferably from about $10^2$ to about $10^{-1}$ ohms-cm.

A first, preferably graphite, carbon black in an amount of from about 5 to about to about 80, and preferably from about 25 to about 75 percent by weight of a second, preferably non-graphite, carbon black filler, is preferably used in combination with a second conductive carbon black in an amount of from about 1 to about 30, and preferably from about 3 to about 20 percent by weight of the first carbon black filler.

Examples of suitable carbon blacks useful herein include those non-graphite carbon blacks such as KETJEN BLACK® from ARMAK Corp; VULCAN® XC72, VULCAN® XC72, BLACK PEARLS® 2000, and REGAL® 250R available from Cabot Corporation Special Blacks Division; THERMAL BLACK® from RT Van Derbilt, Inc.; Shawinigan Acetylene Blacks available from Chevron Chemical Company; furnace blacks; ENSACO® Carbon Blacks and THERMAX Carbon Blacks available from R.T. Vanderbilt Company, Inc.; and those graphites available from Southwestern Graphite of Burnet, Tex., GRAPHITE 56-55 (10 microns, $10^{-1}$ ohm/sq), Graphite FP 428J from Graphite Sale, Graphite 2139, 2939 and 5535 from Superior Graphite, and Graphites M450 and HPM850 from Asburry.

In a particularly preferred embodiment of the invention, a preferred mixture of carbon black comprises non-graphite carbon black such as BLACK PEARL® 2000 which has a nitrogen surface area of 1500 $m^2/g$, an oil absorption of 300 cc/100 g, a non-crystalline shape, a particle size of 12 nanometers, and a density of 9 $lbs/ft^3$, used in combination with a graphite carbon black having a density of from about 1.5 to about 2.25 $lbs/ft^3$, a coefficient of friction of about $0.1\mu$, a crystalline shape, and a particle size of about 10 microns.

Figure 5:
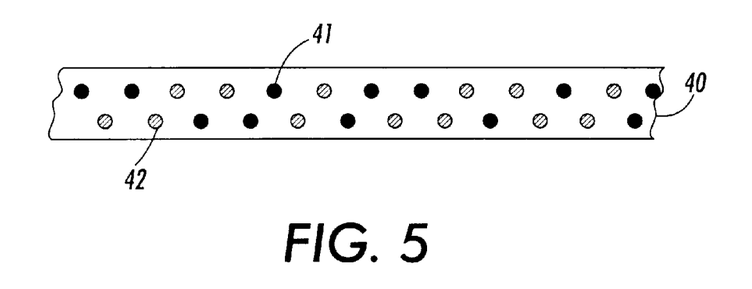
FIG. 5 depicts an embodiment of the present invention including a one layer configuration.
Figure 6:
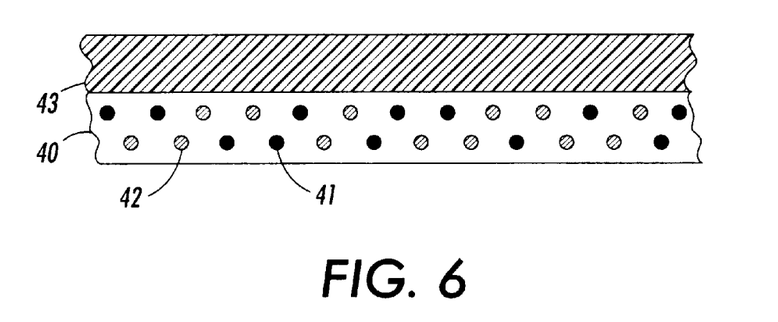
FIG. 6 depicts an embodiment of the present invention including a two layer configuration wherein the polymer/mixed carbon black resistive heating layer is the substrate.
Figure 7:
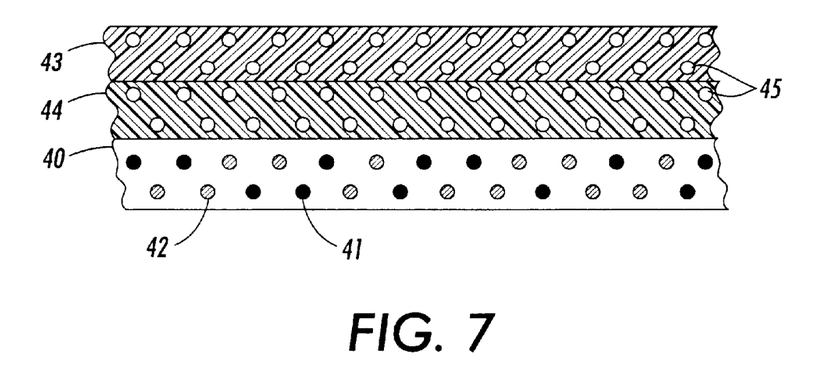
FIG. 7 depicts an embodiment of the present invention including a three layer configuration including a polymer/mixed carbon black resistive heating layer as the substrate, an intermediate layer and an outer layer.

In a preferred embodiment of the invention, the polymer and mixed carbon black layer is a resistive heating layer 40 as depicted in FIG. 5, comprising a polymer and mixed carbon black fillers comprising a first graphite carbon black 41 and a second non-graphite conductive carbon black 42. This one layer configuration may be useful as a fusing belt, such as a transfuse belt. The polymer/mixed carbon black resistive heating layer may be present as a film, belt, sheet or the like, and may have an outer layer 43 positioned thereon as shown in FIG. 6, comprising any suitable polymer and preferably a fluoroelastomer preferably filled with a conductive filler. In another embodiment as depicted in FIG. 7, there is positioned between the outer coating 43 and the polymer/mixed carbon black resistive heating layer 40, an intermediate layer 44 comprising any suitable polymer, and preferably a polyimide preferably filled with a conductive filler. In a particularly preferred embodiment of the invention, both the intermediate layer 44 and the outer coating layer 43 are filled with a filler 45 (or more than one filler) selected from the group consisting of fluorinated carbon, metal oxides, metal carbides, metal nitrides, metal oxide composites, and mica. Preferably, the conductive filler is fluorinated carbon or aluminum oxide. The above one layer, two layer and three layer embodiments which include a polymer/mixed carbon black resistive heating layer 40, are particularly suitable for use in a transfuse application such as a transfuse belt, film, sheet or like component.

The outer layer 43 of the above two layer and three layer fusing configurations as depicted in FIGS. 6 and 7 can be any suitable polymer which provides adequate release. Examples of suitable polymers include fluorocarbon elastomers such as those available from Dupont Dow Elastomers, Wilmington, Del.; Ausimont Inc., Morristown, N.J.; Daikin Industries, Ltd., Tokyo, Japan; and Dyneon L.L.C., Oakdale, Minn.; are also useful. Preferred fluorocarbon elastomers include copolymers and terpolymers of vinylidenefluoride, hexafluoropropylene and tetrafluoroethylene, which are known commercially under various designations as VITON A®, VITON E®, VITON E60C®, VITON E45®, VITON E430®, VITON 910®, VITON GH®, VITON B50®, and VITON GF®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, TN505® available from Montedison Specialty Chemical Company.

Two preferred known fluoroelastomers are (1) a class of copolymers of vinylidenefluoride, tetrafluoroethylene and hexafluoropropylene known commercially as VITON A® and (2) a class of terpolymers of vinylidenefluoride, hexafluoropropylene, and tetrafluoroethylene known commercially as VITON B®. VITON A® and VITON B®, and other VITON® designations are trademarks of E.I. DuPont de Nemours and Company.

In another preferred embodiment, the fluoroelastomer is a tetrapolymer having a relatively low quantity of vinylidenefluoride. An example is VITON GF®, available from E.I. DuPont de Nemours, Inc. The VITON GF® has 35 weight percent of vinylidenefluoride, 34 weight percent of hexafluoropropylene and 29 weight percent of tetrafluoroethylene with 2 weight percent cure site monomer. The cure site monomer can be those available from DuPont such as 4-bromoperfluorobutene-1, 1,1-dihydro-4-bromoperfluorobutene-1,3-bromoperfluoropropene-1, 1,1-dihydro-3-bromoperfluoropropene-1, or any other suitable, known, commercially available cure site monomer.

The intermediate layer 44 as depicted in FIG. 7, is preferably a polyimide or a fluoroelastomer. Examples of suitable polyimides are set forth below. Examples of suitable fluoroelastomers are set forth above.

Figure 8:
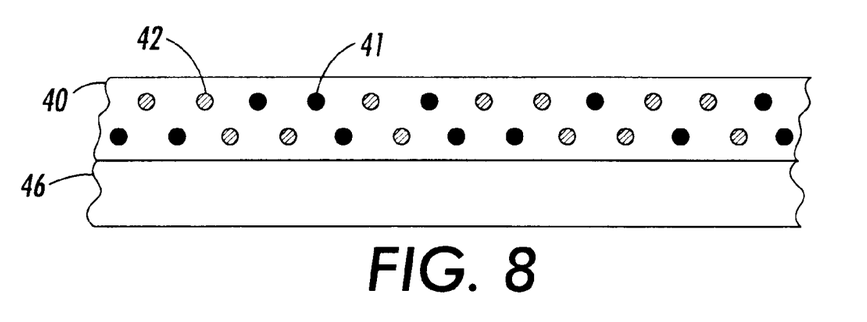
FIG. 8 depicts an embodiment of the present invention including a two layer configuration wherein the polymer/mixed carbon black resistive heating layer is positioned over a substrate.
Figure 9:
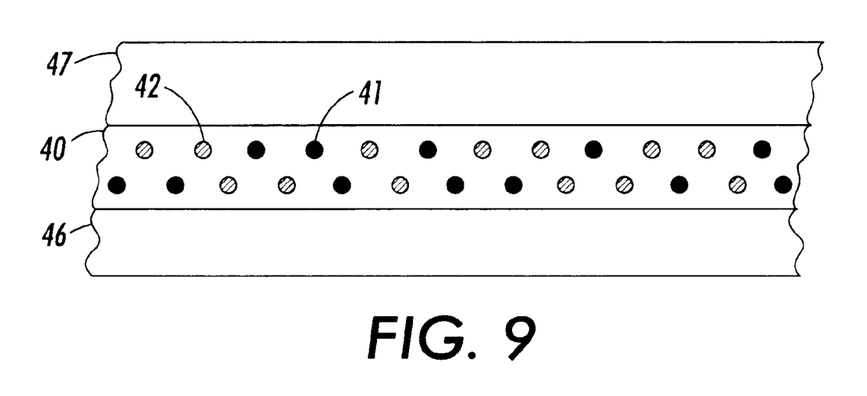
FIG. 9 depicts an embodiment of the present invention including a three layer configuration wherein the polymer/mixed carbon black resistive heating layer is positioned over a substrate and beneath an outer coating.

In another preferred embodiment of the invention, the polymer and mixed carbon black layer is a resistive heating layer 40 positioned on a substrate 46 as shown in FIG. 8. The substrate can be in the form of a roll, belt, sheet, film or the like. In the embodiment wherein the substrate is in the form of a roll, preferably, the roll comprises a high temperature plastic material such as polyimide or the like. The polymer/mixed carbon black layer 40 may have an outer heat transporting layer or toner releasing layer 47 positioned thereon as shown in FIG. 9. The heat transporting layer or toner releasing layer comprises any suitable polymer, and preferably comprises a fluoroelastomer or a silicone rubber. An embodiment wherein the substrate 46 of the embodiments shown in FIG. 8 is a belt, is particularly suitable for use as a fusing belt. The embodiment depicted in FIG. 9, and like embodiments, is particularly suitable for use as an instant-on fuser member 31 as shown in FIG. 4.

Suitable plastics for use herein, particularly for use as the substrate for the two layer fuser belt (46 in FIG. 8), the intermediate layer of the three layer transfuse belt (44 in FIG. 7), or the substrate layer of the three layer instant-on fuser roll (46 in FIG. 9) include: Ultem® available from General Electric, Ultrapek® available from BASF, PPS (polyphenylene sulfide) sold under the tradenames Fortron® available from Hoechst Celanese, Ryton R-4® available from Phillips Petroleum, and Supec® available from General Electric; PAI (polyamide imide) sold under the tradename Torlon® 7130 available from Amoco; polyketone (PK) sold under the tradename Kadel® E1230 available from Amoco; PI (polyimide); polyaramide; PEEK (polyether ether ketone) sold under the tradename PEEK 450GL30 from Victrex; polyphthalamide sold under the tradename Amodel® available from Amoco; PES (polyethersulfone); PEI (polyetherimide); PAEK (polyaryletherketone); PBA (polyparabanic acid); silicone resin; or fluorinated resin such as PTFE (polytetrafluoroethylene); PFA (perfluoroalkoxy); FEP (fluorinated ethylene propylene); liquid crystalline resin (Xydar®) available from Amoco, and the like, or mixtures thereof. These plastics can be filled with glass or other minerals in order to enhance their mechanical strength without changing the thermal properties. In preferred embodiments, the plastic is comprised of a high temperature plastic with superior mechanical strength such as polyphenylene sulfide, polyamide imide, polyimide, polyketone, polyphthalamide, polyether ether ketone, polyethersulfone, and polyetherimide. Also, suitable materials include silicone rubbers.

In the embodiments of the present invention, the resistive heating layer 40 has a thickness of from about 0.1 to about 10 mils, preferably from about 0.5 to about 5 mils, and particularly preferred from about 1 to about 5 mils. The fuser member may comprise a substrate, and thereover, a coating. In an embodiment wherein the substrate is a film, belt, or sheet and has at least one other layer, the substrate has a thickness of from about 0.5 to about 5 mils. The outer layers in the above configurations, including the toner releasing layer of the instant-on fuser member has a thickness of from about 0.1 to about 10 mils, and preferably from about 0.5 to about 5 mils.

In the instant-on configuration, wherein the resistive heating layer 40 is an intermediate layer, the thickness of the resistive heating layer is from about 0.1 to about 10, and preferably from about 0.5 to about 5 mils, and the toner releasing layer or outer layer has a thickness of from about 0.1 to about 10 mils, and preferably from about 0.5 to about 5 mils.

The fuser member may also include one or more, and preferably from about 1 to about 5 intermediate layers, including adhesive layers. Optional intermediate adhesive layers and/or polymer layers may be applied to achieve desired properties and performance objectives of the present member. An adhesive intermediate layer may be selected from, for example, epoxy resins and polysiloxanes. Preferred adhesives are proprietary materials such as THIXON 403/404, Union Carbide A-1100, Dow TACTIX 740, Dow TACTIX 741, and Dow TACTIX 742. A particularly preferred curative for the aforementioned adhesives is Dow H41. Preferred adhesive(s) for silicone adhesion is A4040 silane available from Dow Corning Corp., Midland, Mich. 48686, equivalent adhesive/primers are D.C. 1200 also from Dow Corning and S-11 silane from Grace Specialty Polymers, Lexington, Mass. Adhesion of fluorocarbon elastomers is accomplished with Chemlok® 5150 available from Lord Corp., Coating and Lamination Division, Eire, Pa.

Preferably, the resistance across electrodes of the rollers in contact with the belt, in the belt, sheet, and film embodiments herein, is from about 3 to about 200 ohms, and preferably from about 4 to about 50 ohms.

A polymer, preferably a fluoroelastomer, is present in the resistive heating layer 40 in an amount of from about 20 to about 80 percent by weight of total solids, and preferably from about 30 to about 70 percent by weight of total solids. The total filler carbon black mixture comprising more than one type or variety of carbon black, is preferably present in a total amount of from about 80 to about 20, and preferably from about 70 to about 30 percent by weight of total solids. Total solids as used herein refers to the total amount by weight of polymer, total carbon black fillers, optional metal fillers, and optional additives.

Other fillers, in addition to carbon blacks, can be added to the resistive heating layer, and any other layer, and dispersed or contained therein. Suitable fillers include metal oxides such as magnesium oxide, tin oxide, zinc oxide, aluminum oxide, zirconium oxide, barium oxide, barium titanate, silicon oxide, titanium dioxide and the like; nitrides such as silicon nitride, boron nitride, and the like; carbides such as titanium carbide, tungsten carbide, boron carbide, silicon carbide, and the like; composite metal oxides such as Zircon ($ZrO_2.Al_2O_3$), Spinel ($MgO.Al_2O_3$), Mullite ($3Al_2O_3.2SiO_2$), Sillimanite ($Al_2O_3.SiO_2$), and the like; mica; other carbons such as fluorinated carbon; and combinations thereof. Preferred fillers include fluorinated carbon and aluminum oxide. Optional fillers are present in the polymer/mixed carbon black coating in an amount of from about 0.5 to about 15 percent by weight of total solids, and preferably from about 1 to about 10 percent by weight of total solids.

It is preferred that the bulk resistivity of the resistive heating layer be from about $10^{-5}$ to about $10^3$ ohms-cm, preferably from about $10^{-4}$ to about $10^1$ ohms-cm, and particularly preferred about $10^{-3}$ to about $10^{-1}$ ohms-cm.

The hardness of the polymer/carbon black mixture resistive heating layer is preferably less than about 90 Shore A, more preferably from about 45 to about 65 Shore A, and particularly preferred from about 50 to about 60 Shore A.

The circumference of the component in a film or belt configuration of from about 1 to about 5 or more layers, is from about 3 to about 150 inches, preferably from about 5 to about 50 inches, and particularly preferred from about 15 to about 44 inches. The width of the film or belt is from about 8 to about 60 inches, preferably from about 8 to about 48 inches, and particularly preferred from about 8 to about 26 inches. It is preferably that the film be an endless, seamed flexible belt or a seamed flexible belt, which may or may not include puzzle cut seam(s). Examples of such belts are described in U.S. Pat. Nos. 5,487,707; 5,514,436; and U.S. patent application Ser. No. 08/297,203 filed Aug. 29, 1994, the disclosures each of which are incorporated herein by reference in their entirety. A method for manufacturing reinforced seamless belts is set forth in U.S. Pat. No. 5,409,557, the disclosure of which is hereby incorporated by reference in its entirety.

The layer or layers may be deposited on a substrate via a well-known coating processes. Known methods for forming outer layer(s) on a substrate film such as dipping, spraying such as by multiple spray applications of very thin films, casting, flow-coating, web-coating, roll-coating, extrusion, molding, or the like can be used. It is preferred to deposit the layers by continuous coating such as by multiple spray applications of very thin films, by web coating or by flow-coating.

The electrostatographic copying process described herein is well known and is commonly used for light lens copying of an original document. Analogous processes also exist in other electrostatographic printing applications such as, for example, digital laser printing where a latent image is formed on the photoconductive surface via a modulated laser beam, or ionographic printing and reproduction where charge is deposited on a charge retentive surface in response to electronically generated or stored images. The coatings are useful in all such applications.

All the patents and applications referred to herein are hereby specifically, and totally incorporated herein by reference in their entirety in the instant specification.

The following Examples further define and describe embodiments of the present invention. Unless otherwise indicated, all parts and percentages are by weight of total solids.

EXAMPLES

Example I
Resistive Heating Layer with Fluoroelastomer and Single Type of Carbon Black Graphite powder (from Aldrich) in an amount of about 9.4 grams and VITON® GF (from DuPont) in an amount of about 8.8 grams, were mixed in a solvent mixture of 96 grams of methyl ethyl butyl ketone (MIBK) and 24 grams of methyl ethyl ketone (MEK) in a small bench top attritor (model 01A) containing about 1,200 grams of steel shot. The mixture was attrited for about 1 hour. A curative package (0.3 grams DIAK III and 0.3 grams Maglite-Y) were then introduced, and the resulting dispersion was further mixed in the attritor for another approximately 20 minutes. After filtering the steel shot through a wire screen, the dispersion was collected in an 8-ounce polypropylene bottle. The dispersion was coated onto KAPTON® (polyimide) substrates by a known spray coating technique. The coated layer was air-dried for 0.5 hours and heat cured at 235° C. for about 18 hours. The result was a resistive layer containing 50 percent by weight of total layer graphite in VITON® GF. The thickness of the layer was determined to be about 1.5 mil.

The prepared layer was then cut into a 4.5 inch by 9 inch slice and a conductive silver paste was applied at both ends as electrodes. The resistance of the layer was measured using a Xerox 600T1616 RMS Digital Multimeter and was found to be about 35±2 ohms. The time required to heat up the layer from room temperature 25° C. to 170° C. (hereinafter referred to as the warm-up time) was measured by applying an AC current into the layer through the electrodes. The temperature of the heating layer was determined using an Omega CN76,000 Digital IR Thermal Controller. The applied power was calculated from the measured current and resistance values. For the above layer, the warm-up time was determined to be about 6 seconds at an applied power of about 600 watts. The resistance of the layer was found to be stable in the temperature range investigated.

Example II
Resistive Heating Layer Comprising Fluoroelastomer and Mixed Carbon Black/Graphite (BLACK PEARL® 2000 and Graphite)

Various amounts of BLACK PEARL® 2000 (carbon black) were added to the above dispersion in Example 1, comprising VITON® GF and graphite. The mixture was collected in 8-ounce polypropylene bottles. The dispersions were coated onto KAPTON® (polyimide) substrates by a known spray coating technique as in Example 1. The coated layers were air-dried for 0.5 hours and heat cured at 235° C. for about 18 hours. The results were approximately 1.5 mil thick, resistive heating layers containing 50 percent by weight of graphite (Aldrich) and varying amounts of BLACK PEARL® 2000 and VITON® GF as set forth in Table I below. The amount of curative was adjusted based on the amount of VITON® GF used in the layer. The resistances and warm-up times were determined using the procedures described in Example 1. The data are tabulated in Table 1 below.

TABLE 1

| Amount of BP ® 2000 (by weight) | Resistance (ohms) | Warm-up Time (seconds) | Power (watts) |
|---|---|---|---|
| 3 | 41 | 4 | 600 |
| 5 | 30 | 3.5 | 600 |
| 8 | 20 | 3.5 | 500 |
| 13 | 24 | 4 | 500 |

The results show that addition of BLACK PEARL® 2000 into the graphite/fluoroelastomer layer reduces the layer resistance, leading to a shorter warm-up time as compared to Example 1.

Example III
Fluoroelastomer Layer Containing BLACK PEARL® 2000 Only

A VITON® GF layer containing approximately 13 percent by weight of BLACK PEARL® 2000 (from Cabot) was prepared using the procedure described in Example I. The resistance of an approximately 1.5 mil layer (4.5"×9") was determined to be about 1270 ohms. The layer did not heat up to 170° C. even after 3 minutes when an AC power was applied across the electrodes.

Example IV
Resistive Heating Layer Comprising Fluoroelastomer and Mixed Carbon Black/Graphite (BLACK PEARL® 2000 and Graphite FP428J)

A set of resistive heating layers were prepared using the formulation and procedures described in Example II with the exception that a Graphite FP428J was used in place of the synthetic graphite from Aldrich. The resistances and the warm-up times of these layers are tabulated in Table 2. The thickness of these layers were determined to be about 1.5 mil.

TABLE 2

| Amount of BP ® 2000 (by weight) | Resistance (ohms) | Warm-up Time (seconds) | Power (watts) |
|---|---|---|---|
| 3% | 10 | 4 | 500 |
| 8% | 10 | 4 | 500 |
| 10% | 12 | | |

Example V
Resistive Heating Layers of Different Thicknesses Comprising Fluoroelastomer and Mixed Carbon Black/Graphite Resisting heating layers of different thicknesses were prepared using the graphite and BLACK PEARL® 2000 in Examples II and IV. The warm-up times of these layers are shown below in Table 3.

TABLE 3

| Graphite Type | BP ® 2000 (by weight) | Thickness (mil) | Resistance (ohms) | Warm-up Time (sec) | Power (watts) |
|---|---|---|---|---|---|
| Aldrich | 8% | 1.2 | 26 | 4 | 500 |
| Aldrich | 8% | 2 | 20 | 5 | 500 |
| FP428 | 8% | 3 | 5 | 5 | 500 |
| FP428 | 8% | 4 | 4 | 4 | 600 |

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A fuser member having a resistive heating layer comprising a polymer and a mixture of more than one variety of carbon black, said mixture comprising a first carbon black and a second carbon black of a different variety than said first carbon black.

2. A fuser member in accordance with claim 1, wherein said first carbon black is graphite, and said second carbon black is a carbon black other than graphite.

3. A fuser member in accordance with claim 1, wherein said first carbon black has a particle size of from about 0.1 micron to about 100 microns and said second carbon black has a particle size of from about 10 nanometers to about 80 nanometers.

4. A fuser member in accordance with claim 1, wherein said first carbon black has a bulk resistivity of from about of $10^0$ to about $10^{-5}$ ohms-cm and said second carbon black has a bulk resistivity of from about $10^4$ to about $10^{-2}$ ohms-cm.

5. A fuser member in accordance with claim 1, wherein said polymer is a fluoroelastomer selected from the group consisting of a) copolymers of vinylidene fluoride, hexafluoropropylene and tetrafluoroethylene, b) terpolymers of vinylidene fluoride, hexafluoropropylene and tetrafluoroethylene, and c) tetrapolymers of vinylidene fluoride, hexafluoropropylene, tetrafluoroethylene and a cure site monomer.

6. A fuser member in accordance with claim 5, wherein said fluoroelastomer comprises about 35 weight percent of vinylidenefluoride, about 34 weight percent of hexafluoropropylene, about 29 weight percent of tetrafluoroethylene, and about 2 weight percent cure site monomer.

7. A fuser member in accordance with claim 1, further comprising an outer layer on said resistive heating layer.

8. A fuser member in accordance with claim 7, wherein said outer layer comprises a fluoroelastomer.

9. A fuser member in accordance with claim 7, further comprising an intermediate layer positioned between said resistive heating layer and said outer layer.

10. A fuser member in accordance with claim 9, wherein said intermediate layer comprises a polyimide.

11. A fuser member in accordance with claim 9, wherein said intermediate layer and said outer layer further comprise a filler selected from the group consisting of fluorinated carbon, metal oxides, metal carbides, metal nitrides, metal oxide composites, and mica.

12. A fuser member in accordance with claim 1, wherein said resistive heating layer is in the form of a transfuse belt.

13. A fuser member in accordance with claim 1, further comprising a substrate positioned beneath said resistive heating layer.

14. A fuser member in accordance with claim 13, wherein said substrate comprises a polyimide.

15. A fuser member in accordance with claim 13, wherein said substrate is in the form of a fuser belt.

16. A fuser member in accordance with claim 13, further comprising an outer toner releasing layer on said resistive heating layer.

17. A fuser member in accordance with claim 16, wherein said outer toner releasing layer comprises a material selected from the group consisting of fluoroelastomers and silicone rubbers.

18. A fuser member in accordance with claim 16, wherein said substrate comprises a high temperature plastic cylindrical roll.

19. A fuser member in accordance with claim 18, wherein said substrate comprises a material selected from the group consisting of polyamide imide, polyketone, polyether ketone, polyphthalamide, polyether sulfone, polyether imide, polyarylether ketone, and liquid crystalline resins.

20. A fuser member in accordance with claim 1, wherein said resistive heating layer has a bulk resistivity of from about $10^{-5}$ to about $10^3$ ohms-cm.

21. A fuser member in accordance with claim 1, wherein said mixture of carbon black comprises a carbon black having a particle size of about 12 nanometers and graphite having a particle size of about 10 microns.

22. A fuser member in accordance with claim 1, wherein said resistive heating layer has a thickness of from about 0.1 to about 10 mils.

23. An apparatus for forming images on a recording medium comprising:

a charge-retentive surface to receive an electrostatic latent image thereon;

a development component to apply toner to said charge-retentive surface to develop said electrostatic latent image and to form a developed image on said charge retentive surface;

a transfer component to transfer the developed image from said charge retentive surface to a substrate; and a fixing component having a resistive heating layer comprising a polymer and a mixture of more than one variety of carbon black, said mixture comprising a first carbon black and a second carbon black of a different variety than said first carbon black.

* * * * *